Sept. 10, 1929.  J. SCHULZ  1,727,911

SOWING MACHINE

Filed May 12, 1928

INVENTOR

Patented Sept. 10, 1929.

1,727,911

UNITED STATES PATENT OFFICE.

JOSEF SCHULZ, OF PECKY, CZECHOSLOVAKIA.

SOWING MACHINE.

Application filed May 12, 1928, Serial No. 277,330, and in Czechoslovakia June 4, 1927.

This invention relates to a sowing machine for sowing seeds of any kind and grain-size, and tubercles and onions.

According to the invention the lower portion of the charging hopper is formed by two discs rotatable at different speeds and inclined the one towards the other so that between them a guide groove of movable width is formed through which the seeds are conveyed towards the mouth of the hopper. The seeds are turned in the guide groove, owing to the different rotating speeds of the two discs, so that the seeds are brought into the correct position for dropping out. For sorting the seeds according to size two triangular plates are arranged between the discs, one edge of each triangular plate being shiftably mounted on the surface of the corresponding disc so that the lower corners of the triangular plates form in the guide groove a constantly varying opening through which the seeds drop into the ridges. Several of these devices may be arranged side by side so that sowing in several ridges can be carried out at the same time.

The improved machine is much simpler and more practical than the machines of known type.

Figure 1:
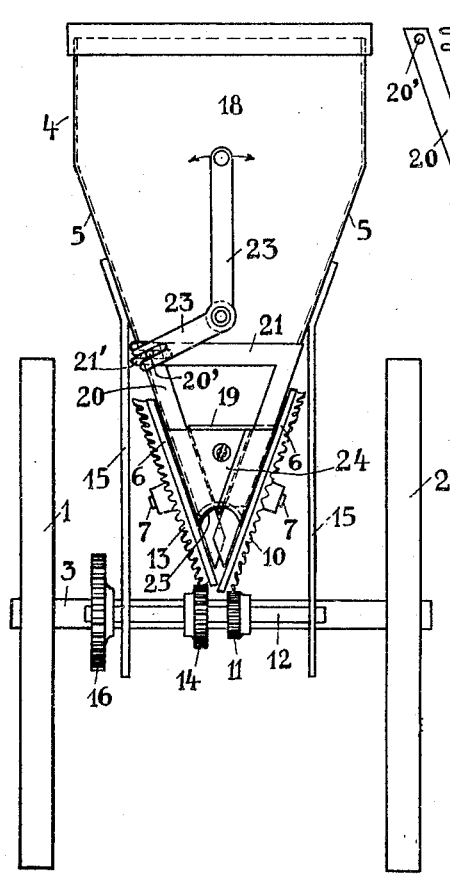
Figure 2:
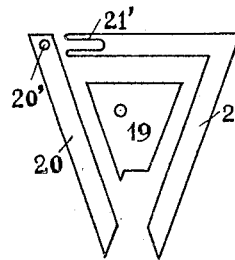
Figure 3:
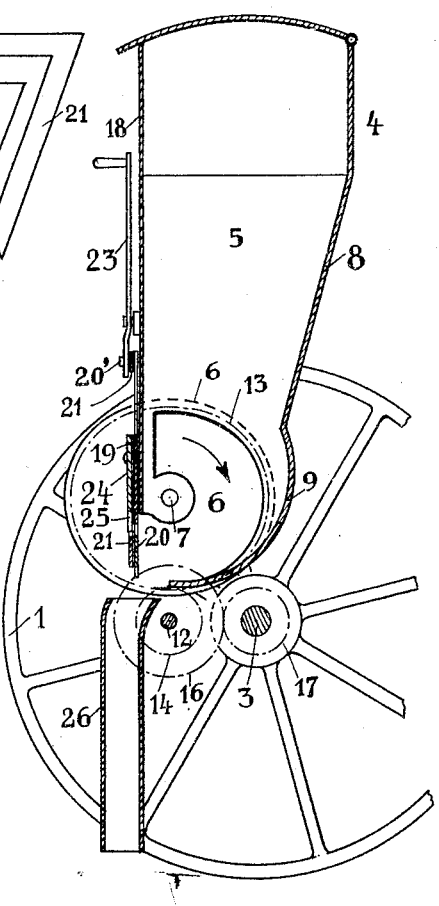

A single-ridge sowing machine is illustrated, by way of example, in the accompanying drawing in:

Fig. 1 in elevation.
Fig. 2 shows one of the triangular plates.
Fig. 3 is a side-elevation of Fig. 1 partly in section.

The machine frame mounted on wheels 1 and 2 is to be drawn by hand. A charging hopper 4 is mounted on the wheel axle 3, the side walls 5 of said hopper being inwardly inclined to join at an acute angle. In the lower portion of each side-wall 5 a ring-shaped portion is cut out and a disc 6 is rotatably mounted over this cut-out portion. The axles 7 of the discs 6 are journaled in the solid central part of the ring-shaped cut-out portion.

The rear-wall 8 of the hopper is inwardly inclined at the lower end and merges into a curved portion 9 which extends between said two discs 6 to form a kind of bottom-plate.

On one of the discs 6 a spur-wheel 10 is fixed meshing with a pinion 11 mounted on a shaft 12. A spur-wheel 13 fixed on the other disc 6 meshes with a pinion 14 of greater diameter also mounted on shaft 12 so that the two discs 6 are driven at different speeds from the shaft 12.

The shaft 12 is journaled in bearings arranged in vertical walls 15, extending from the side-walls 5 of the charging hopper and to which other auxiliary means and the pole are fixed.

On one end of shaft 12 a spur-wheel 16 is keyed which meshes with a spur-wheel 17 keyed on the wheel axle 3.

A clutch-coupling of known type (not shown in the drawing) serves to couple and uncouple the spur-wheel 16.

The front-wall 18 of the hopper 4 is vertical and cut out at the lower end between the discs 6, 6. Above this cut-out portion of the front-wall a triangular plate 19 is fixed which forms together with the surfaces of discs 6 guides for two bars 20 and 21, adapted to be shifted along the discs 6 by means of a lever 22, 23 and a stud 20' on the top-end of bar 20 engaging with a slot 21' in the corresponding end of bar 21 so that the bevelled ends of the bars 20, 21 form between the discs 6 a variable opening through which the seeds drop out. A plate 24 covering the bars 20, 21 is fixed on the triangular plate 19. This plate 24 has at the lower end a cut-out portion 25, the width of which corresponds with the maximum grain-size of the seeds. The seeds drop from the mouth of the charging hopper into a vertical tube 26 which conducts the seeds into the ridges.

When necessary an agitator may be arranged in the charging hopper.

I claim:

1. A hopper for machines for sowing seeds of any kind and size, comprising in combination inwardly inclined side-walls having ring-shaped cut out portions at the lower end, a disc rotatably mounted on the outer surface of each side-wall to cover said ring-shaped cut-out portion, and gear-wheel-transmissions for driving said discs at different speeds.

2. In a hopper as specified in claim 1 in combination with the rotatable discs, a triangular plate in the triangular interval between said discs arranged so that one of the side edges of said plate bears shiftably against the surface of the corresponding disc, two inclined bars shiftably mounted one at either side of said triangular plate, and a hand lever for mutually shifting said bars to alter the width of the mouth of said hopper.

In testimony whereof I affix my signature.

JOSEF SCHULZ.